Patented July 16, 1935

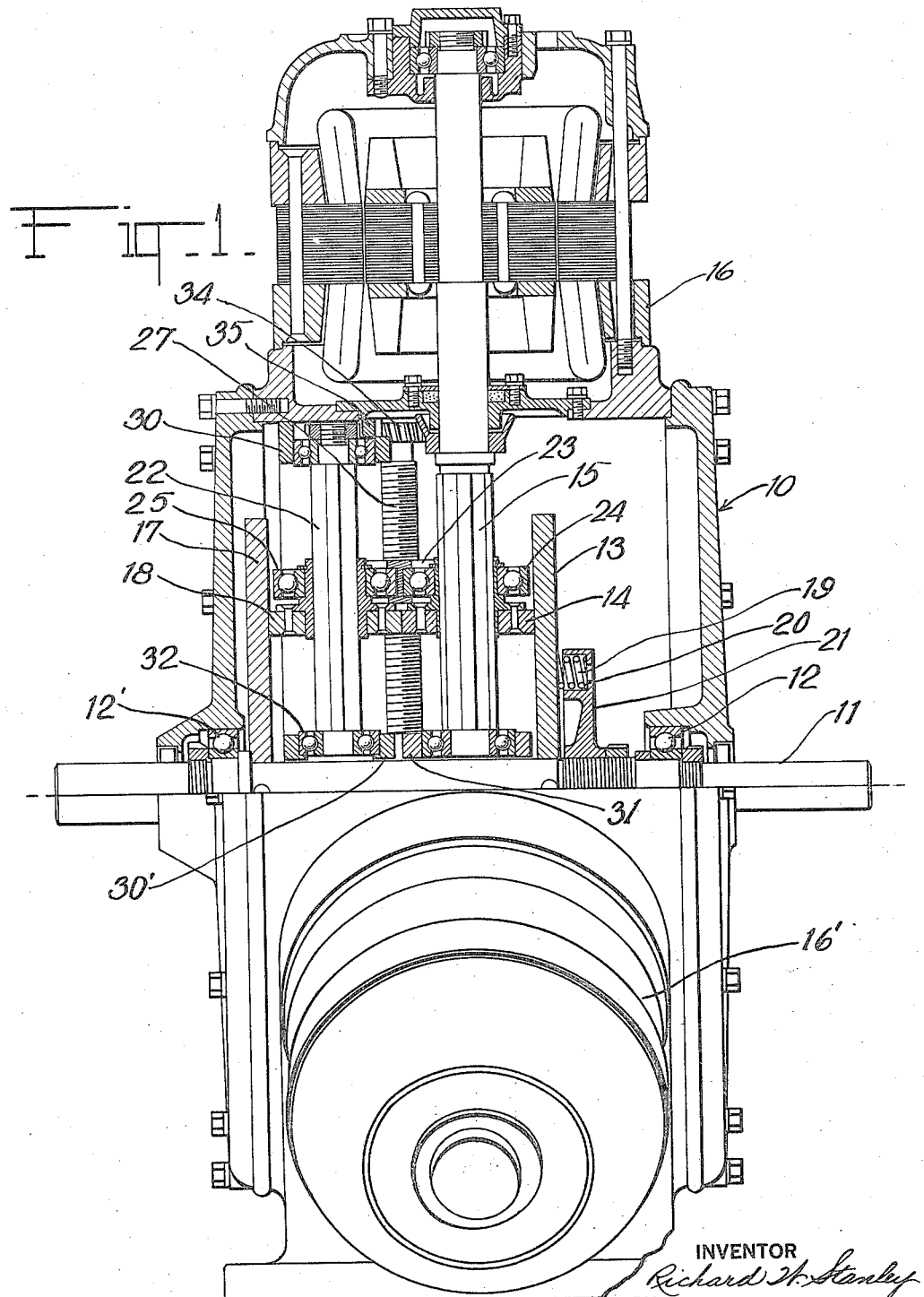

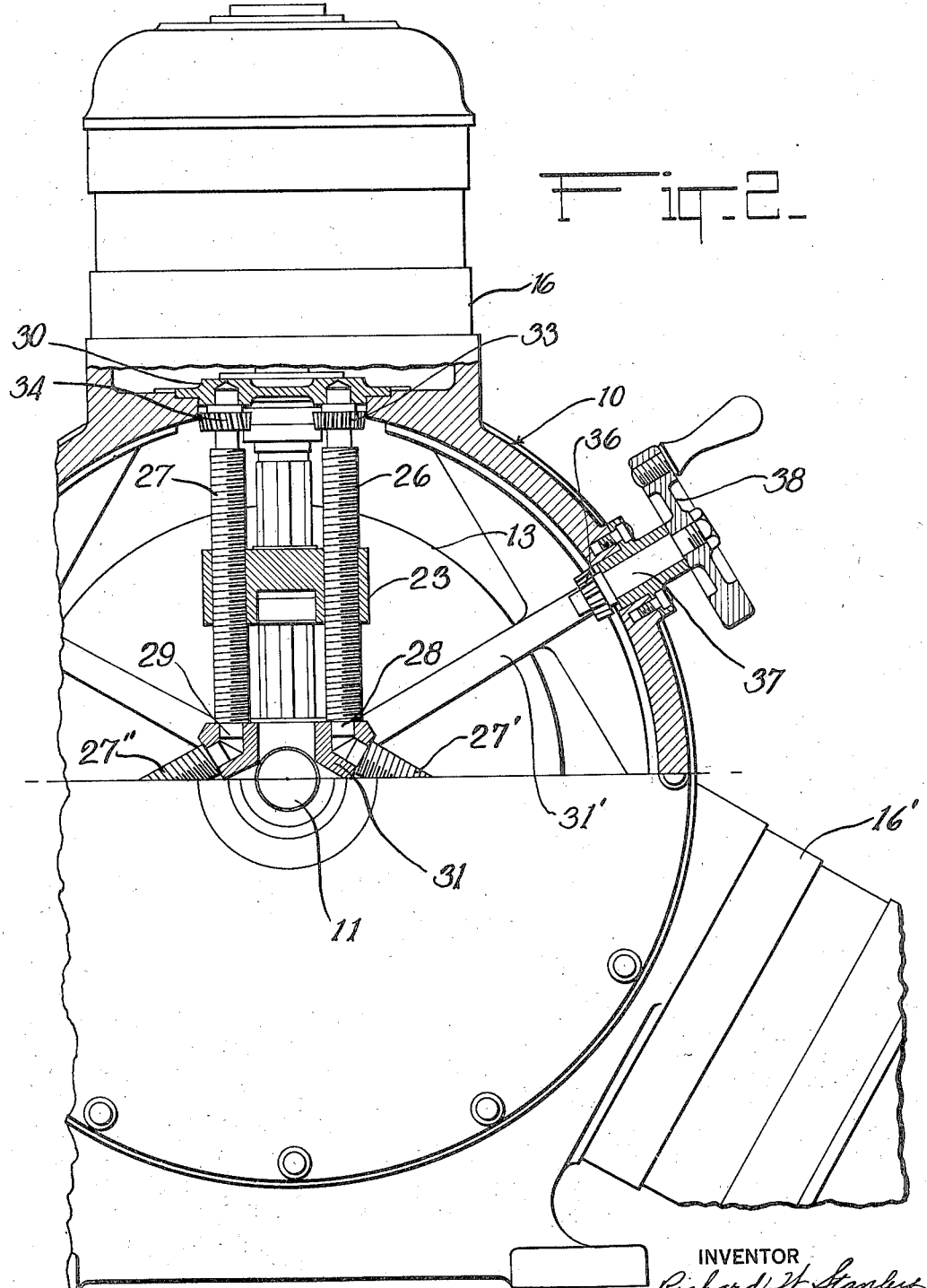

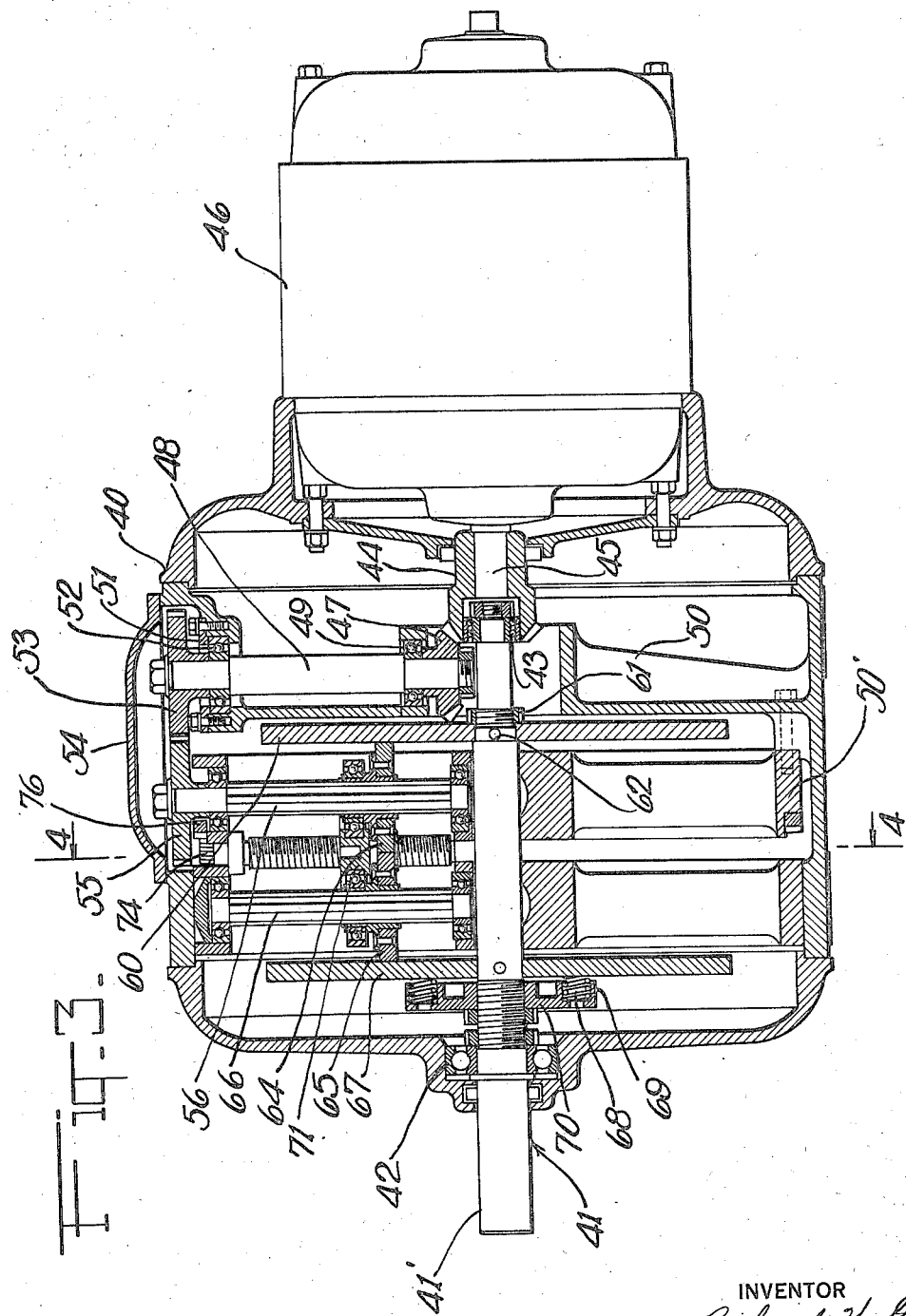

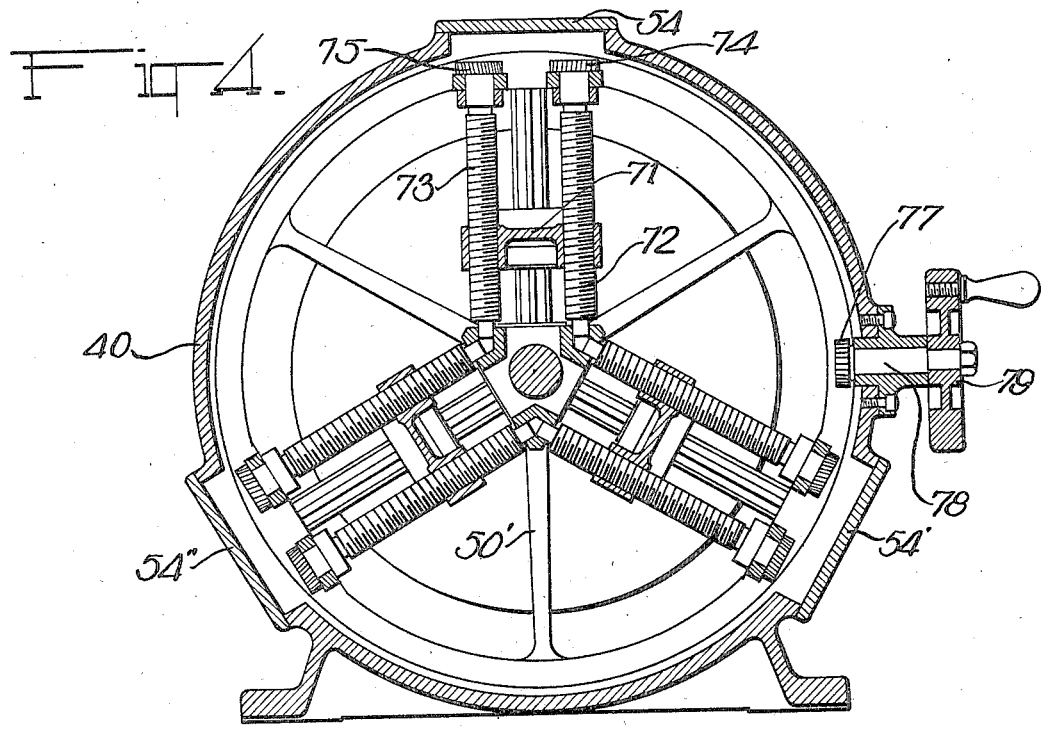
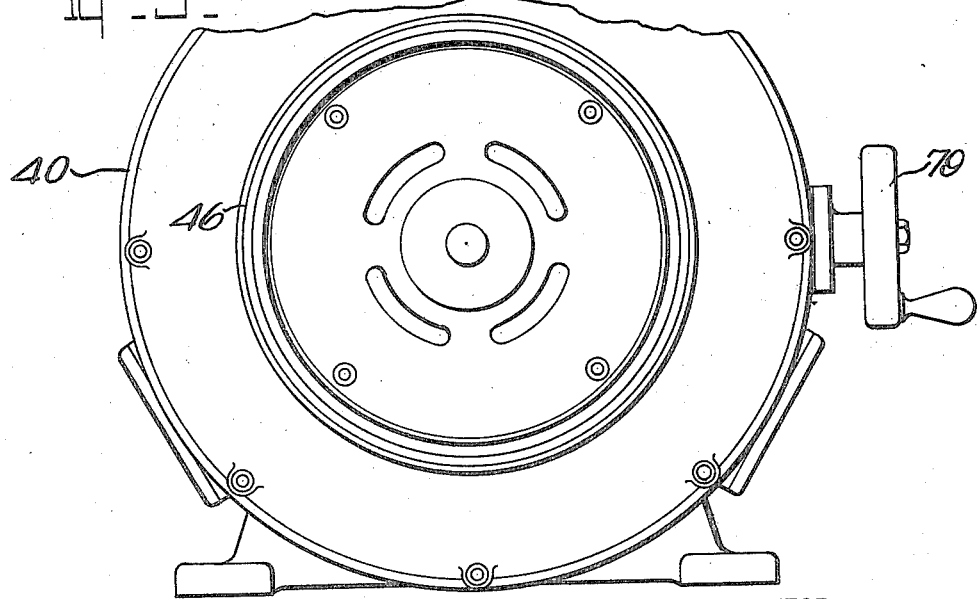

2,008,048

UNITED STATES PATENT OFFICE 2,008,048

VARIABLE SPEED TRANSMISSION SYSTEM

Richard W. Stanley, Lockport, N. Y.

Application December 21, 1931, Serial No. 582,358

6 Claims. (Cl. 74—195)

This invention relates to variable speed transmission systems and particularly to a system which may be embodied in a unitary mechanism to transmit power with substantially infinite gradations of speed.

The invention has for its object generally an improved construction and arrangement of parts for systems of the character described, which is efficient, economical and readily manufactured.

More specifically, it is an object of the invention to provide a mechanism of the character indicated in which the power for driving the power-transmission shaft is transmitted through relatively movable elements in rolling contact arranged so that slip is avoided and designed to function with reference to the co-efficient of adhesion.

Another object is to provide a plurality of paths for transmitting the driving force to a driven shaft running at variable speeds so arranged that the transmitting elements react to balance the thrust.

Still another object is to provide balancing trains of power-transmitting elements, certain of which are in rolling contact and relatively movable, arranged to have uniform bearing pressures and to be driven by constant speed motive means whereby the speed and torque of the driven shaft vary inversely.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which:

Fig. 1 is a view partly in section and partly in side elevation, showing a variable speed power-transmitting mechanism constructed in accordance with the invention;

Fig. 2 is an end view of the power-transmitting mechanism shown in Fig. 1, partly in section taken along the lines 2—2 of Fig. 1 and partly in elevation, still other parts being broken away;

Fig. 3 is a view partly in section and partly in elevation, showing a modified form of variable speed power-transmitting mechanism, constructed in accordance with the invention;

Fig. 4 is a sectional view of the device shown in Fig. 3, taken on the line 4—4 of Fig. 3; and Fig. 5 is an end elevation of the device shown in Fig. 3, parts being broken away.

Referring now to the drawings and particularly to Fig. 1, 10 denotes generally a casing arranged to house and support power-transmitting mechanism provided with means for varying the speed in accordance with the invention. 11 is a power-transmitting shaft journalled in this casing in any suitable manner, for example, by means of ball-bearings as shown at 12 and 12'. 13 denotes a driving disk splined or otherwise secured to the shaft 11 in a non-rotative manner.

In order to drive disk 13, a roller 14 is provided bearing against the driving surface of the disk 13 adhesively, the roller having its axis of rotation at an angle to the shaft 11. In the arrangement shown, this angle is 90 degrees, the roller 14 being slidably mounted upon a driving shaft 15 which is coincident with the axis. This driving shaft may be driven in any suitable manner, for example, by means of an electric motor 16 mounted on the casing 10 and directly coupled to the shaft 15.

In order that the elements which are in rolling contact, such as the roller 14 and disk 13 may transmit power with a relatively high degree of efficiency, these elements are arranged to engage with uniform bearing pressures and to have an associated train for reactively transmitting a portion of the power in a manner which balances the thrust. The elements hence should adhere constantly and run without slip. The materials employed in the construction of these elements are selected with reference to this characteristic. Hardened steel is an example of a suitable material for both the roller and the disk.

The associated train for thus transmitting a portion of the power through a different path to the shaft 11 comprises a second disk 17 which is non-rotatably mounted on the power-transmitting shaft within the casing 10 and spaced from the disk 13 a sufficient distance to accommodate the roller 14 together with a second roller 18 that may be disposed in contact with the roller 14. The pair thus provided divide the power being transmitted and by their mutual reactions balance the bearing thrusts against the disks 13 and 17. In order that the bearing pressure may be uniform between the disks and rollers, means are provided to keep the rolling contacts between these elements constant. To this end one disk, for example that at 17 is made fast to the shaft 11, while the other is arranged to have a limited motion thereon under elastic restraint. Suitable resilient means are arranged to provide the elastic restraint, such means being embodied in the helical springs shown at 19 arranged yieldingly to urge the disk 13 toward the disk 17 whereby the disks and rollers are in contact under uniform pressure. The springs 19 are here retained by means of socket-like formations 20 in a spider 21 that is rigidly secured on the shaft 11 adjacent the disk 13.

The roller 18 is arranged to be slidable on an idling shaft 22 which is disposed parallel to the shaft 15. The shaft 22 is journalled in a suitable frame or spider 30 which is preferably slidably fitted into the casing 10 and keyed or otherwise secured against rotation. The spider has a central hub-like portion 30' arranged to support the inner end of the shaft 22. The shaft 15 is similarly supported by a formation in the casing 10 which has a central hub-like portion 31 supporting the inner end of the shaft 15, this being supported through arms 31' extending inwardly from the casing as shown in Fig. 2.

The speed variations desired are effected in the present mechanism by moving the roller 14 and its associated roller 18 along the shafts 15 and 22 so as to vary their bearing points on the disks 13 and 17. This is conveniently accomplished by providing a frame 23 on the shafts 15 and 22 in which the rollers 14 and 18 are journalled and supported, the frame being movable back and forth on the shafts in a manner such as to reciprocate radially the rollers 14 and 17 with respect to the disks 13 and 17. The journals for the rollers in the frame 23 may be of any suitable variety, for example ball-bearings as indicated at 24 for the roller 14 and at 25 for the roller 18.

In order to effect the movement of the frame 23, a driving screw, preferably a pair as shown at 26 and 27 in Fig. 2, is provided and arranged to engage at the sides with the frame for reciprocating the same in the casing in a manner which avoids binding. These screws are journalled in the spider 30, their lower ends as indicated at 28 and 29 turning in a central portion 31 that projects inwardly from the casing and extends in somewhat concentrated fashion about the power shaft 11. This portion also supports the lower ends of shafts 15 and 22 previously described as journalled therein, ball-bearings for this purpose being shown at 32.

In order to actuate the screws 26 and 27, and cause them to rotate and move the frame 23 like a nut, the upper ends of these screws are provided with gears as shown at 33 and 34 respectively disposed near the inner periphery of the casing 10. These gears mesh with a suitable ring gear 35 that is mounted in the casing 10 extending around its periphery in a clearance space in the spider 30, the ring gear in turn being engaged at a suitable point by a small actuating gear 36 that is supported by the casing 10. This support as shown in Fig. 2 is afforded by a short shaft 37, journalled in the casing, on the outer end of which is secured a hand-wheel 38 for manipulating the gear 36. When rotated the ring gear 35 is caused to travel about the periphery of the casing thereby rotating the gears 33 and 34. This in turn moves frame 23 and causes the desired variation in the speed with which disk 13 is driven by the roller 14.

The motor 16 is preferably one with a constant speed or a shunt characteristic, the speed variation in consequence being obtained solely by rotating the hand-wheel 38 which causes movement of the roller 14 radially across the disk 13 from an inner engaging point where the disk is driven at maximum speed for the arrangement shown to a point near the outer periphery of the disk 13 where the roller 14 drives the disk at a minimum speed. It should be noted, however, that due to the constant pressure, whatever the speed of the shaft 11, the horsepower output of the motor and hence of the device itself, is substantially constant, the speed and the torque varying inversely. The motor shown at 16, while here indicated as of the induction type for use on alternating current, may be of any convenient type having the desired characteristic as the motor itself is no part of the present invention.

While the present invention may be practiced with a single power-driven roller bearing on a power-transmitting disk, together with its reactive associate, it is preferable to use a plurality of rollers distributed about the shaft 11 because of the larger amount of power that may be transmitted by this means. It is also seen that where the rollers bear on the disk 13 symmetrically with respect to the shaft 11, then there is less tendency for the disk 13 to bind upon the shaft and the thrust between the roller and the disk is better compensated for.

In the preferred arrangement shown in Figs. 1 and 2, three rollers of the character shown at 14 are arranged to bear upon the disk 13, the rollers together with their reactive associates being respectively displaced about the axis of the disk by angles of 120 degrees. A second motor 16' is accordingly shown in Figs. 1 and 2 so displaced from motor 16 and secured to the casing 10 as to drive a second roller of the character shown at 14, a screw for adjusting the same being shown at 27'. A similar screw for the third roller is shown at 27''. In this arrangement, it is seen that the adhesive pressure between the rollers of the character shown at 14 and the disk 13, is evenly distributed about the disk. The three motors likewise are preferably so designed as to divide evenly the load and drive the rollers 14 synchronously when transmitting power to the disk 13. Any usual lubricating system may be used, for example, the splash method wherein the bottom of the casing is filled with oil through which the various parts move.

When the three motors in the mechanism shown in Figs. 1 and 2 are started, driving force is transmitted simultaneously to the rollers as shown at 14. The hand-wheel at 38 when turned will actuate all the screws in the housing 10 simultaneously by reason of the fact that the ring gear 35 extends completely about the periphery of the casing and engages with all of the actuating gears. Consequently a simultaneous and fine adjustment of the rollers upon the disk 13 is achieved by a single manual adjustment, the adhesive pressure of the rollers upon the disk 13 being substantially uniform at all times and an inherent effect of the mechanism here disclosed.

In the modified form of the mechanism shown in Fig. 3, an arrangement is employed whereby rollers may bear upon the driving disk at one or a plurality of points, but in either arrangement a single driving motor is used. Here 40 denotes a casing in which a driven power-transmitting shaft 41 is journalled; one end, that shown at 41', projects from the casing and is journalled at 42, the other being contained within the casing and is journalled at 43 in a socket-like formation provided in the end of a gear 44, that is journalled within the casing. Gear 44 is on a shaft 45 of a motor 46 which is mounted on the end of the casing for driving the mechanism, the shafts 45 and 41 being coaxial in this arrangement. The gear 44 is of the beveled variety and meshes with a second beveled gear 47 that is secured on a shaft 48 journalled in the casing 40 at right angles to the shaft 41 and arranged to transmit power to the driving disk. The inner end of the shaft 48 is journalled in the casing 40 in any suitable manner, for example by means of a ball-bearing 49 supported in a spider 50 which is formed in the casing and adapted to support portions of the mechanism therein. A portion of the spider 51 near the periphery of the housing supports another ball-bearing 52 for the shaft 48, the outer end of the shaft being provided with a power-transmitting gear 53. This gear rotates in a clearance space in the casing 40 which preferably has a removable closure 54 whereby access for inspection of the gearing at this point may be had when desired. The gear 53 is arranged to mesh with a second gear 55 that is disposed preferably in the same clearance space and secured upon a driving shaft 56 which is journalled at its ends in a secondary spider 50' in parallel relation with the shaft 48. The shaft 41 has a driving disk 60 non-rotatively secured thereon, this being here accomplished by means of a pin in the shaft engaging a key-way in the disk and a lock-nut 61 which holds the disk rigidly in place against a shoulder 62 on the shaft. A roller 64 sliding on the shaft 56 is arranged to bear adhesively upon the disk 60. This roller is associated with a compensating roller 65 sliding upon a parallel shaft 66, the latter roller being in engagement with a second disk 67 also mounted on the shaft 41 in a non-rotative manner. This second disk is shown as having a limited amount of sliding movement upon the shaft and reacts against a plurality of resilient abutments such as springs 68 mounted in sockets 69 formed in the small spider 70 that is rigidly secured on the shaft 41.

The speed variation in this latter mechanism is accomplished in substantially the same manner as that first described. A frame 71 is accordingly provided which carries the rollers 64 and 65 when it is desired to move them along their shafts 56 and 66. This frame is arranged to be reciprocated by means of screws, as shown at 72 and 73 in Fig. 4, the lower ends of which as will be seen from an inspection of this figure, are journalled in the spider 50', the outer ends being provided with small gears 74 and 75 arranged to mesh respectively with a ring gear 76 disposed peripherally about the casing in a clearance space underneath the gears 55. (This is clearly shown in Fig. 3.) The actuation of the ring gear is accomplished by means of a small gear 77 in the casing meshing therewith and mounted on a shaft 78 journalled in and passing through the casing and having a hand-wheel 79 at its outer end so as to be manually manipulated to vary the speed when desired.

While in this form of device a single roller 64 may be employed for engaging the driving disk 60, it is preferable as indicated above to employ a plurality, for example three sets of rollers such as shown at 64 and 65, which are displaced by angles of 120 degrees about the axis of the shaft 41. Also, there would be provided three sets of gears of a character shown at 53 and 55 for driving the three sets of rollers, there being in consequence three shafts as shown at 48 driven simultaneously by the mitered gear 44, the clearance spaces for their driving connections being at equally spaced places about the casing 40, as depicted in Fig. 4 at 54, 54' and 54''.

In operation, when the motor is set running, it drives the gear 44 and transmits power to the three shafts 48 which in turn drives the three shafts 56 rotating the rollers 64 to drive the disk 60; the driving thrust being compensated for by the reaction through the disk 67. When it is desired to effect a speed variation, the hand-wheel 79 is turned, which causes a displacement of the ring gear 76 in the casing 40. This displacement of the ring gear engaging with the three sets of screw-actuating gears 74 and 75 causes the simultaneous displacement of the three frames 71, so that the rollers 64 and 65 have their points of contact with their respective disks moved radially and simultaneously in the same direction.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent, is:

1. A variable speed-transmitting system, comprising a driven power-transmitting shaft, a driving disk for said shaft fixedly attached thereto, a plurality of pairs of rollers, each pair mounted as a train in power-transmitting relation and each pair arranged to have parallel axes at right angles to said shaft, a second driving disk fixedly attached to said shaft reactively driven by said roller-trains, a plurality of frames, each of said frames supporting one of said pairs, screw means adapted for reciprocating said frames, central means adjacent said shaft and adapted for retaining said screw means, and power means coupled to and adapted for bringing power radially inward to certain of said rollers.

2. A variable speed-transmitting system, comprising a driven power-transmitting shaft, a driving disk for said shaft fixedly attached thereto, a plurality of pairs of rollers, each pair mounted as a train in power-transmitting relation and each pair arranged to have parallel axes at right angles to said shaft, a second driving disk fixedly attached to said shaft reactively driven by said roller-train, a plurality of frames, each of said frames supporting one of said pairs, a plurality of screws adapted for reciprocating said frames, a spider adjacent said shaft and adapted for retaining said plurality of screws, and power means coupled to and adapted for bringing power radially inward to certain of said rollers.

3. A variable speed-transmitting system, comprising a driven power-transmitting shaft, a driving disk for said shaft fixedly attached thereto, a plurality of pairs of rollers, each pair mounted as a train in power-transmitting relation and each pair arranged to have parallel axes at right angles to said shaft, a second driving disk fixedly attached to said shaft reactively driven by said roller-train, a plurality of frames, each of said frames supporting one of said pairs, a plurality of screws adapted for reciprocating said frames, a spider adjacent said shaft and adapted for retaining said plurality of screws, gears fixed on the outer ends of said screws, a ring gear adapted for operating said first-mentioned gear, means for operating said ring gear, and power means coupled to and adapted for bringing power radially inward to certain of said rollers.

4. A variable speed-transmitting system, comprising a driven power-transmitting shaft, a driving disk for said shaft fixedly attached thereto, a plurality of secondary shafts disposed radially about said first named shaft, rollers slidably mounted on each of said secondary shafts and arranged to bear adhesively against said disk, a second disk fixedly attached to said first named shaft, a plurality of additional shafts disposed in parallel relation with said secondary shafts, additional rollers slidably mounted on said additional shafts and interposed between said first named rollers and said second disk, radially movable frames arranged to carry each of said first named rollers and its associated additional roller whereby to slide the same together, a plurality of screws adapted for reciprocating said frames, a spider adjacent said driven shaft and adapted for retaining said pluralities of shafts and screws, and power means coupled to the outer end of certain of said shafts.

5. A variable speed-transmitting system, comprising a driven power-transmitting shaft, a driving disk for said shaft fixedly attached thereto, a plurality of secondary shafts disposed radially about said first named shaft, rollers slidably mounted on each of said secondary shafts and arranged to bear adhesively against said disk, a second disk fixedly attached to said first named shaft, a plurality of additional shafts disposed in parallel relation with said secondary shafts, additional rollers slidably mounted on said additional shafts and interposed between said first named rollers and said second disk, radially movable frames arranged to carry each of said first named rollers and its associated additional roller whereby to slide the same together, a plurality of screws adapted for reciprocating said frames, a spider adjacent said driven shaft and adapted for retaining said pluralities of shafts and screws, gears fixed on the outer ends of said screws, a ring gear adapted for operating said first-mentioned gear, means for operating said ring gear, and power means coupled to the outer end of certain of said shafts.

6. A variable speed-transmitting system, comprising a driven power-transmitting shaft, a driving disk for said shaft fixedly attached thereto, a plurality of secondary shafts disposed radially about said first named shaft, rollers slidably mounted on each of said secondary shafts and arranged to bear adhesively against said disk, a second disk fixedly attached to said first named shaft, a plurality of additional shafts disposed in parallel relation with said secondary shafts, additional rollers slidably mounted on said additional shafts and interposed between said first named rollers and said second disk, radially movable frames arranged to carry each of said first named rollers and its associated additional roller whereby to slide the same together, adjusting means for moving said frames simultaneously in the same relative radial direction, constant-speed motive means comprising a power input shaft coaxial with said driven shaft, a plurality of shafts radial to said input shaft, bevel gearing connecting said input shaft and said radial shafts adapted for transmitting power inwardly to certain of said movable elements, and gearing on the outer end of and adapted for connecting said radial shafts to said plurality of secondary shafts.

RICHARD W. STANLEY.